US008608131B2

(12) United States Patent
Kania

(10) Patent No.: US 8,608,131 B2
(45) Date of Patent: Dec. 17, 2013

(54) FLOOR JACK

(75) Inventor: Anthony Kania, Mesa, AZ (US)

(73) Assignee: Test Rite Products Corp., Ontario (CA)

( * ) Notice: Subject to any disclaimer, the term of this patent is extended or adjusted under 35 U.S.C. 154(b) by 308 days.

(21) Appl. No.: 12/841,881

(22) Filed: Jul. 22, 2010

(65) Prior Publication Data

US 2011/0193035 A1 Aug. 11, 2011

Related U.S. Application Data

(60) Provisional application No. 61/302,075, filed on Feb. 5, 2010.

(51) Int. Cl.
*B62B 3/065* (2006.01)
*B23Q 3/00* (2006.01)

(52) U.S. Cl.
USPC ............................ 254/2 B; 206/378; 254/8 B

(58) Field of Classification Search
USPC ......... 81/177.4, 490; 206/216, 372, 373, 374, 206/375, 376, 377, 378; 254/2 B, 8 R, 9 B, 254/8 B; 269/17
See application file for complete search history.

(56) References Cited

U.S. PATENT DOCUMENTS 1,721,756 A 7/1929 Walker
1,951,398 A * 3/1934 Dearsley ....................... 254/2 B
2,180,572 A * 11/1939 White ........................... 206/375
2,610,025 A * 9/1952 Mueller ........................ 254/2 B
2,766,007 A * 10/1956 Krilanovich .................. 254/124
2,789,788 A 4/1957 Wilson
4,018,421 A 4/1977 Tallman
D274,668 S 7/1984 Eliasson
4,765,009 A 8/1988 Hung
4,811,440 A 3/1989 Scott
5,056,661 A * 10/1991 Balzano ........................ 206/372
5,201,257 A 4/1993 Engel
5,408,752 A * 4/1995 Eadens ........................... 33/376
5,433,127 A 7/1995 Messier
5,438,892 A * 8/1995 Bell ................................ 81/120
5,657,964 A * 8/1997 Yoshida ........................ 254/126
5,669,492 A * 9/1997 Chao ............................ 206/234
D398,730 S 9/1998 Lin
5,975,297 A * 11/1999 Kao ............................. 206/378
6,012,584 A * 1/2000 Dawson ........................ 206/553
D423,750 S 4/2000 Hung
6,070,491 A 6/2000 Claudio et al.
6,113,202 A * 9/2000 Germano ...................... 312/245
6,237,894 B1 5/2001 Cotner et al.
D452,597 S 12/2001 Hung
6,375,160 B1 4/2002 Hung
6,405,865 B1 * 6/2002 Lin .............................. 206/379
6,505,816 B1 1/2003 Hung
6,637,908 B1 10/2003 Hung
6,640,675 B1 * 11/2003 Chuang ........................... 81/490
D485,412 S 1/2004 Hung (Continued)

*Primary Examiner* — Brian Glessner
*Assistant Examiner* — Joseph J Sadlon
(74) *Attorney, Agent, or Firm* — Tsircou Law, P.C.

(57) ABSTRACT

A floor jack is providing having an integrated tool kit. The floor jack includes a jack body and a tool kit assembly disposed on the jack body for housing tools. The tool kit includes a storage housing pivotally coupled to an exterior side of a sidewall of the jack body. The storage housing defining a plurality of storage locations configured to secure tools, such as a socket wrench and a plurality of sockets such that they are exposed and readily assessable for use.

19 Claims, 7 Drawing Sheets

(56) References Cited

U.S. PATENT DOCUMENTS

| | | | | |
|---|---|---|---|---|
| 6,789,785 | B2 * | 9/2004 | Hung | 254/8 B |
| 6,899,319 | B2 | 5/2005 | Hung | |
| 6,910,578 | B2 * | 6/2005 | Stern | 206/379 |
| D513,954 | S | 1/2006 | Richards | |
| D514,768 | S | 2/2006 | Ji | |
| 7,055,652 | B1 * | 6/2006 | Williams | 182/129 |
| D531,377 | S | 10/2006 | Liu | |
| D540,504 | S | 4/2007 | Mathieson | |
| 7,210,578 | B2 * | 5/2007 | Tuan-Mu et al. | 206/378 |
| D544,674 | S | 6/2007 | Hsieh | |
| 7,334,774 | B1 | 2/2008 | Lin | |
| D571,072 | S | 6/2008 | Kong et al. | |
| D579,167 | S | 10/2008 | Lin | |
| D582,623 | S | 12/2008 | Qian et al. | |
| D590,569 | S | 4/2009 | Arzouman | |
| D590,570 | S | 4/2009 | Arzouman | |
| 7,559,287 | B2 * | 7/2009 | Tsumiyama et al. | 114/55.53 |
| D604,025 | S * | 11/2009 | Lin | D34/31 |
| 8,066,259 | B2 * | 11/2011 | Fang et al. | 254/8 B |
| 2003/0136951 | A1 * | 7/2003 | Hung | 254/8 B |
| 2004/0055917 | A1 * | 3/2004 | Stern | 206/373 |
| 2007/0186731 | A1 * | 8/2007 | Schnarr et al. | 81/177.4 |
| 2011/0315572 | A1 * | 12/2011 | Vu et al. | 206/216 |

* cited by examiner

FLOOR JACK

CROSS REFERENCE TO RELATED APPLICATION

This application claims priority to U.S. Application No. 61/302,075, filed Feb. 5, 2010, which is herein incorporated by reference.

FIELD OF THE INVENTION

The present invention relates generally to floor jacks and, more particularly, to floor jacks having a tool kit.

BACKGROUND OF THE INVENTION

A jack is a device for lifting a heavy object and has the properties of easy moving and operation, so the jack is widely used in various industries, and vehicle maintenance in particular. Therefore, almost each vehicle is prepared for a jack.

The underlining reason to lift a vehicle is enable a mechanic to inspect or fix components of the vehicle. To do so, tools are often required. Thus, the user must first raise the vehicle with the jack. Then, find the appropriate tools from a tool kit, carrying those tools underneath the vehicle. When a vehicle is in a remote location, the user must bring both the floor jack and separate tool kit.

SUMMARY OF THE INVENTION

Briefly, and in general terms, the invention provides a floor jack having a jack body and a tool kit assembly disposed on the jack body for housing tools. The tool kit assembly includes a storage assembly configured to house a plurality of tools such as a socket wrench and a plurality of sockets such that they are exposed and readily assessable for use.

More specifically, by way of example and not limitation, the tool kit assembly is pivotally mounted to a first sidewall of the jack body. The storage housing defines a plurality of recesses configured each configured to receive a single wrench socket. The assembly can further include a plurality of wrench sockets. The storage housing is further configured to receive the socket wrench in a conforming recess via snap-fit configuration.

In a detailed aspect of an exemplary embodiment, the floor jack can include a first tool kit assembly mounted on a first side wall of the jack body and a second tool kit assembly mounted on a second side wall of the jack body. In such configurations, the first tool kit assembly can include metric-sized sockets, and the second tool kit assembly can include inch-sized (SAE) sockets.

In yet another detailed aspect of an exemplary embodiment, the tool kit assembly, (or assemblies) is configured to be attached to the sidewall of the jack body in a removable manner and is pivotally attached. In this manner, the assembly can pivot away from the sidewall to facilitate access to the tools. For example, the assembly can include attachments located a bottom portion of a tool housing that interfaces with attachments on the sidewall of the jack body.

The upper end of the tool kit assembly can include a deflectable portion configured to couple to the jack assembly to maintain the tool kit in an upright orientation. For example, the floor jack can include a handle pivotally attached to the jack body. The deflectable portion can couple to the pivot attachment of the handle.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
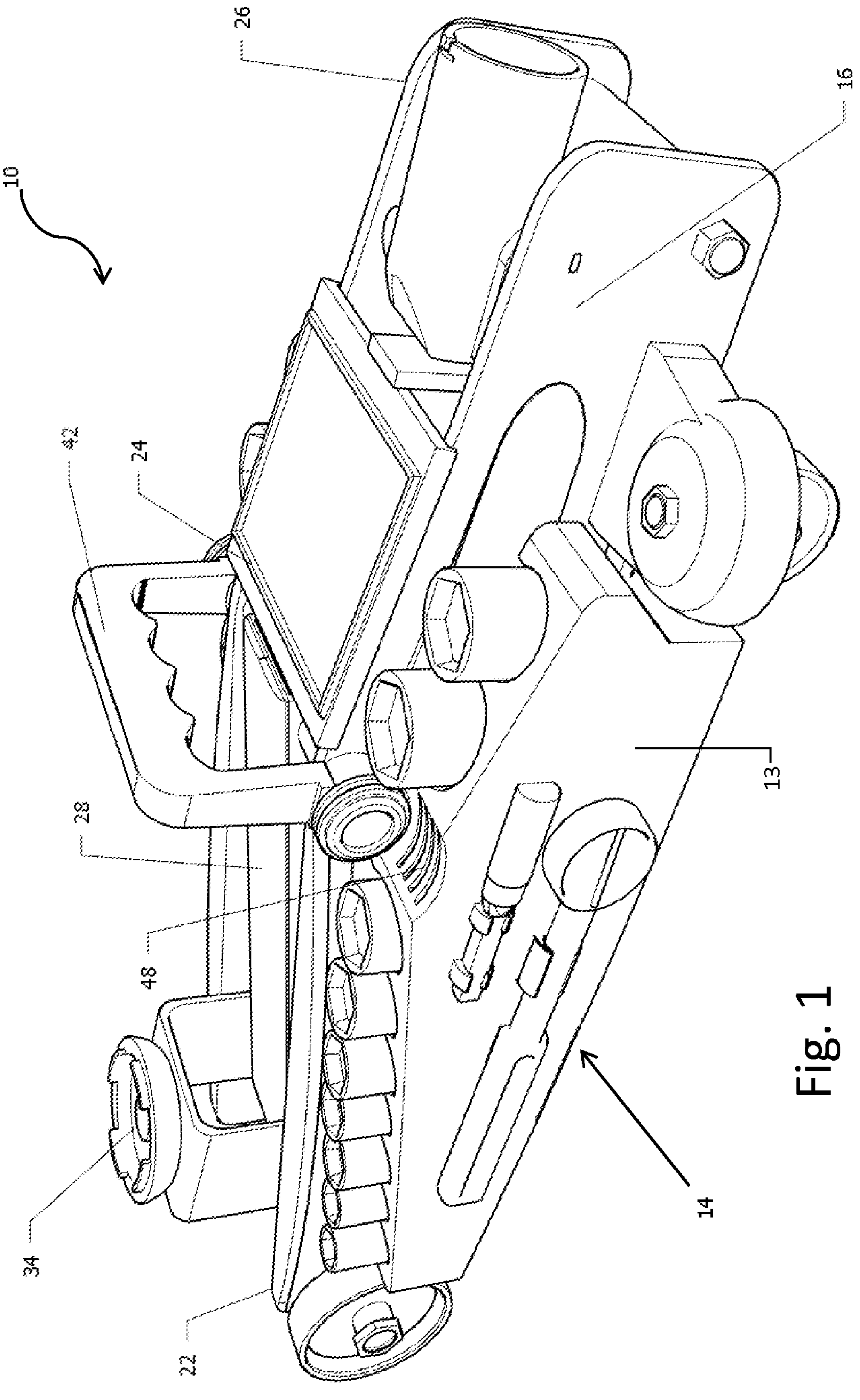
FIG. 1 is a rear, left perspective view of a floor jack in accordance with the invention.
Figure 2:
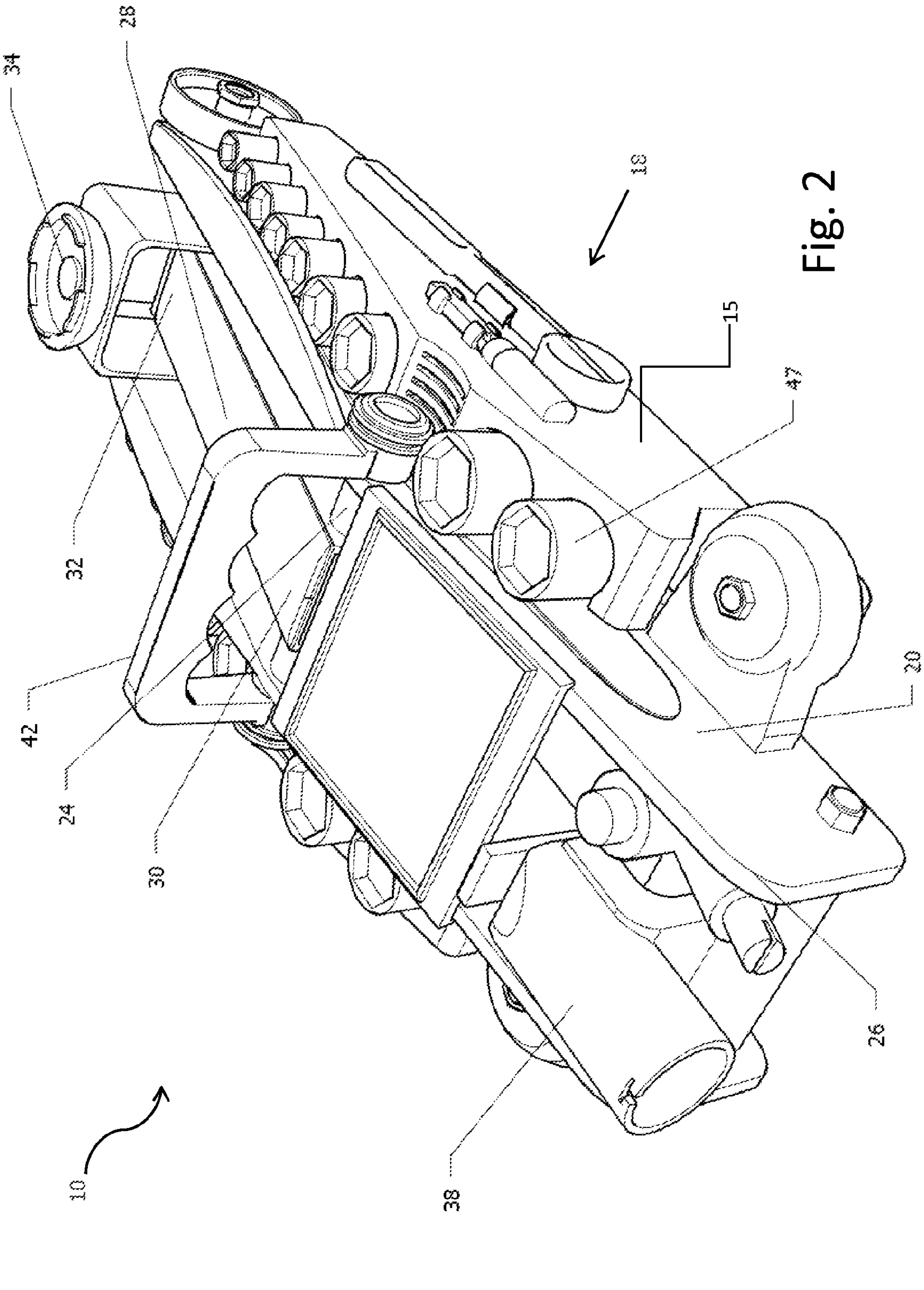
FIG. 2 is a rear, right perspective view of the floor jack of FIG. 1, depicting the driving lever secured to the rotary lock bolt of the floor jack.

Referring now to the drawings, and particularly FIG. 1, there is shown a floor jack 10. The assembly includes a jack body 12, a first tool assembly 14 disposed on a first sidewall 16 of the jack body, and a second tool assembly 18 disposed on a second sidewall 20 of the jack body.

The body 12 includes a front portion 22, an intermediate region 24, and an end portion 26. The body comprises first and second sidewalls 16, 20 spaced apart from each other. A lift arm 28 is coupled to the body. The lift arm has a first end 30 pivotally coupled to the intermediate region of the body and a second end 32 proximate to the front portion. The floor jack further includes a top plate 34 coupled to the second end of the lift arm. The top plate configured to engage a lifting location of an object to be lifted. In the exemplary embodiment, the top plate is configured to engage a lifting location of an automobile; however, in other embodiments the top plate can be configured in various other forms to lift other objects such as a motorcycle via, e.g., spaced apart parallel bars such as those commonly known in the art.

A hydraulic system 36 of the floor jack is housed within the body and configured to raise the lift arm. The hydraulic system is operated by the driving head 38, which is pivotally coupled to the end portion 26 of the body. In use, an engaging portion of a driving lever (not shown) is inserted into an aperture of the driving head to operate a hydraulic system.

The tool assemblies 14, 18 house at least one wrench socket 40. In the exemplary embodiment, the tool assemblies each include a storage housing 13, 15 coupled a corresponding sidewall (16, 20) of the body. The first tool kit assembly includes metric-sized sockets 45, and the second tool kit assembly includes inch-sized (SAE) sockets 47. In this manner, a user has convenient access to wrench sockets commonly used. The storage bodies define a plurality of recesses (41), each configured to receive a single wrench socket of a prescribed size. In the exemplary embodiment, recesses are disposed along an upper edge of the storage bodies.

The floor jack 10 further includes a handle 42 attached to the sidewalls 16, 20 in the intermediate region 24 of the body via pivot attachments 44. The upper edges 46 of the storage bodies include deflectable portions 48 configured to engage the pivot attachments 44 in snap fit arrangement and a detachable manner to maintain the storage bodies in an upright configuration, which can be generally flush with the sidewalls. The deflectable portions are disposed in a curved portion 50 of the upper edge sized to conform to the pivot attachments. The curved portion is located between recesses 41 of the storage housing. The pivot attachments 44 define an annular lip 58 (FIG. 10) positioned to engage the deflectable portions 48 of the storage bodies 13, 15.

Figure 3:
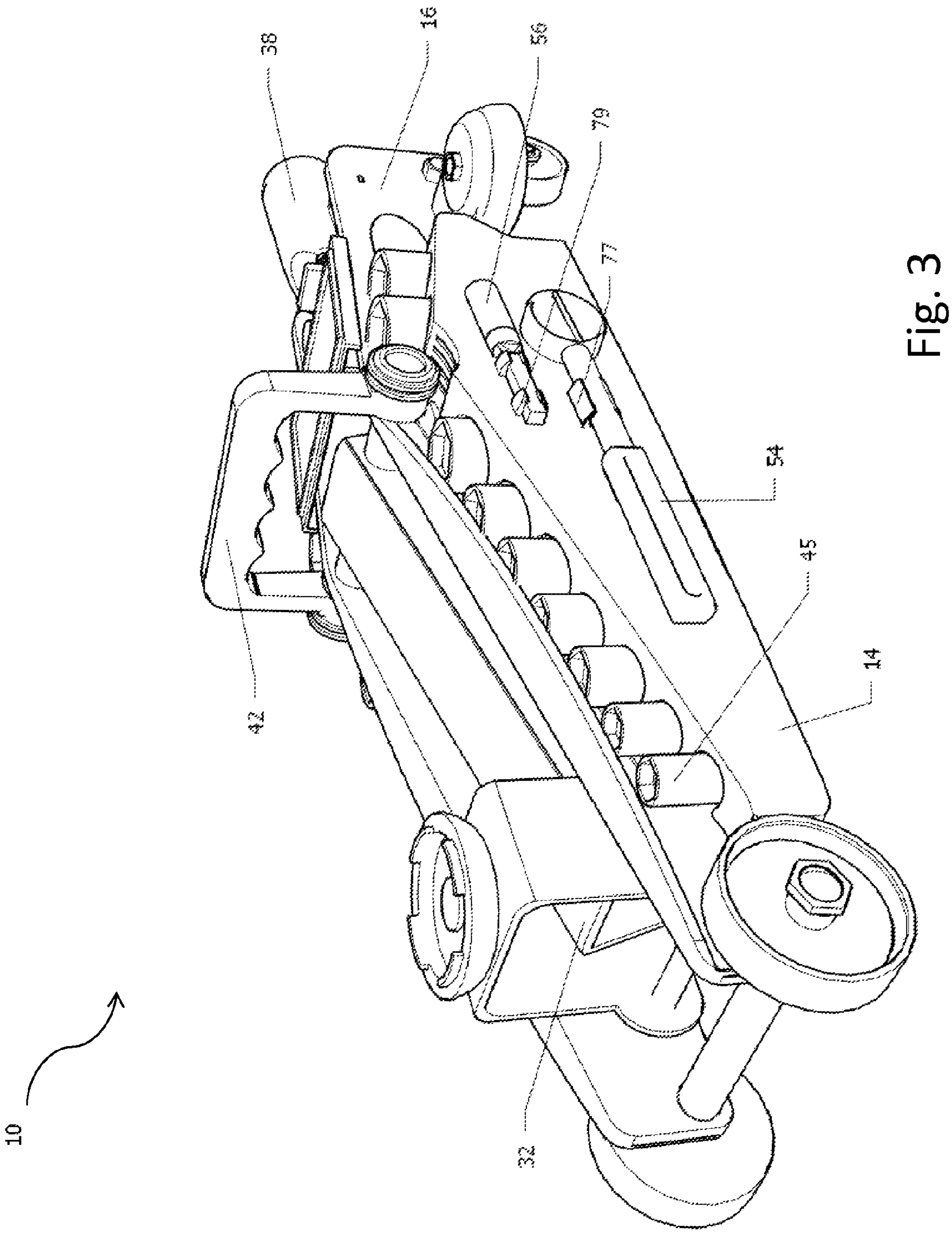
FIG. 3 is a front, left perspective view of the floor jack of FIG. 1, depicting a socket storage assembly housing a plurality of wrench sockets.
Figure 4:
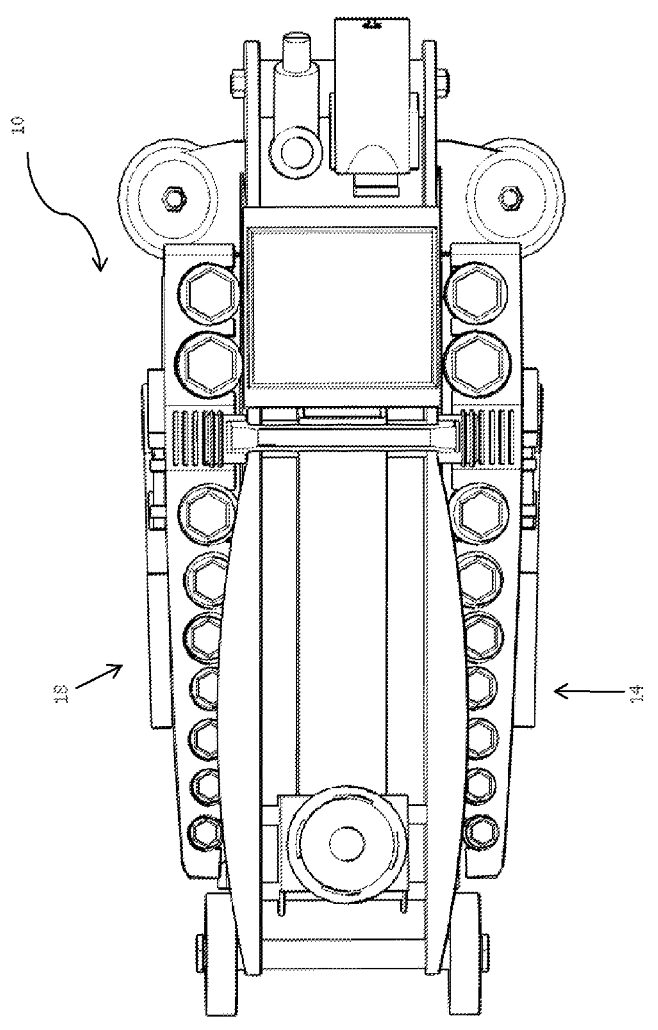
FIG. 4 is a top view of the floor jack of FIG. 1, depicting the driving lever disposed on a lever storage assembly.
Figure 5:
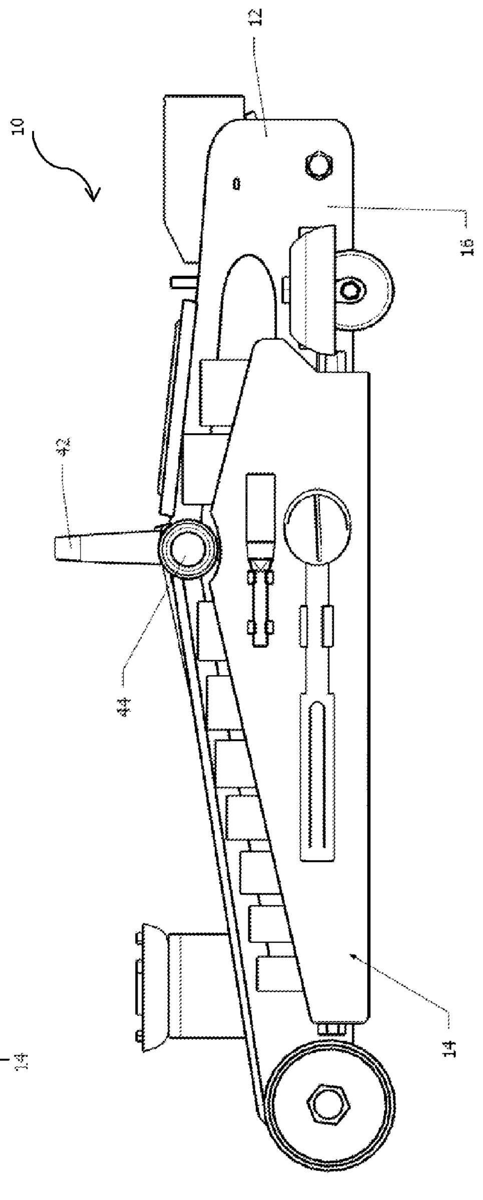
FIG. 5 is a right side elevational view of the floor jack of FIG. 1.
Figure 6:
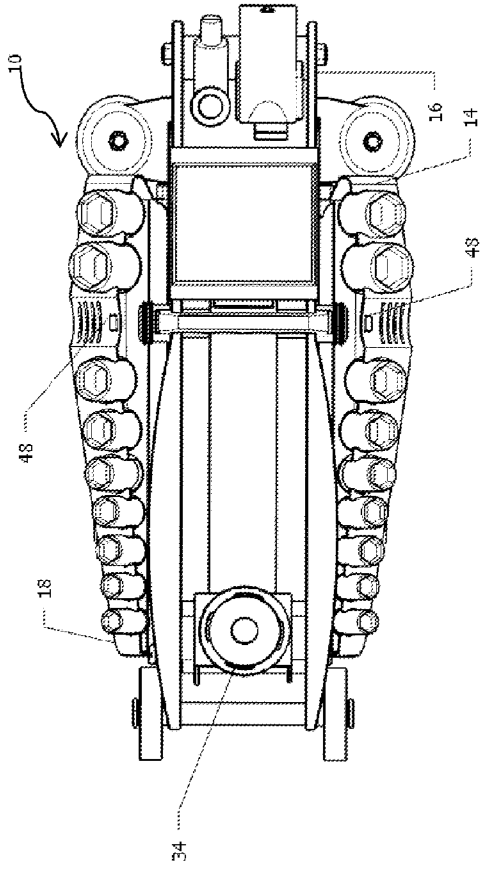
FIG. 6 is a top view of the floor jack of FIG. 1, depicting the first and second tool kit assemblies in an angled configuration.
Figure 7:
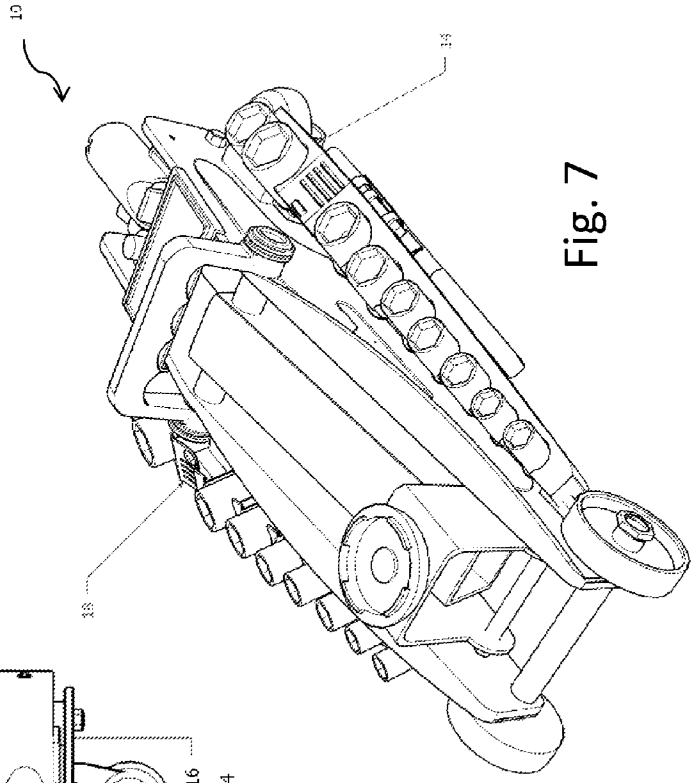
FIG. 7 is a front perspective view of the floor jack of FIG. 1, depicting the first and second tool kit assemblies in an angled configuration.
Figure 8:
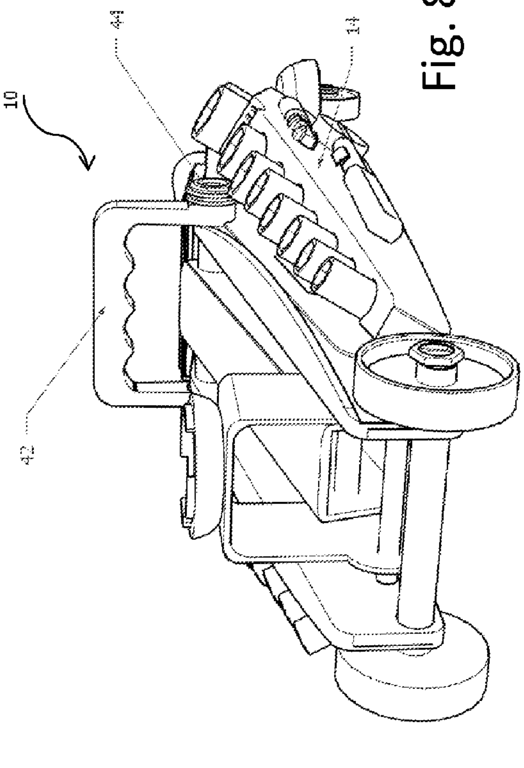
FIG. 8 is a front, close-up perspective view of the floor jack of FIG. 1, depicting the first and second tool kit assemblies in an angled configuration.

A front wall 52, 53 of each storage housing 13, 15 is configured to receive a plurality of tools, such as a wrench 54 and an extender 56. In the exemplary embodiment, the front walls include a plurality of opposing arms 77, 79 (FIG. 3) configured to receive the tools in a snap fit manner. In other embodiment, the storage housing can be configured to hold various other tools, e.g., screwdrivers, Allen wrenches, hex wrenches, and other hand tools known in the art. In other embodiments, various other configurations can be used for storing wrench sockets. For example, the storage assembly can include posts configured to mate with wrench sockets.

With reference now to FIGS. 6-10, opposing sides of the storage housing define apertures 60 configured to mate with pivot posts 62 coupled to the sidewalls 16, 20 of the jack body, forming a pivot attachment for the storage bodies to the sidewalls. The pivot attachment is configure to confine the orientation of each storage housing in a prescribed range such as from a vertical orientation to an angled orientation of about 30 degrees off vertical (e.g., FIG. 6-8). In selected preferred embodiments, the terminal end of the angled orientation is between about 15 degrees to about 45 degrees from vertical.

Figure 9:
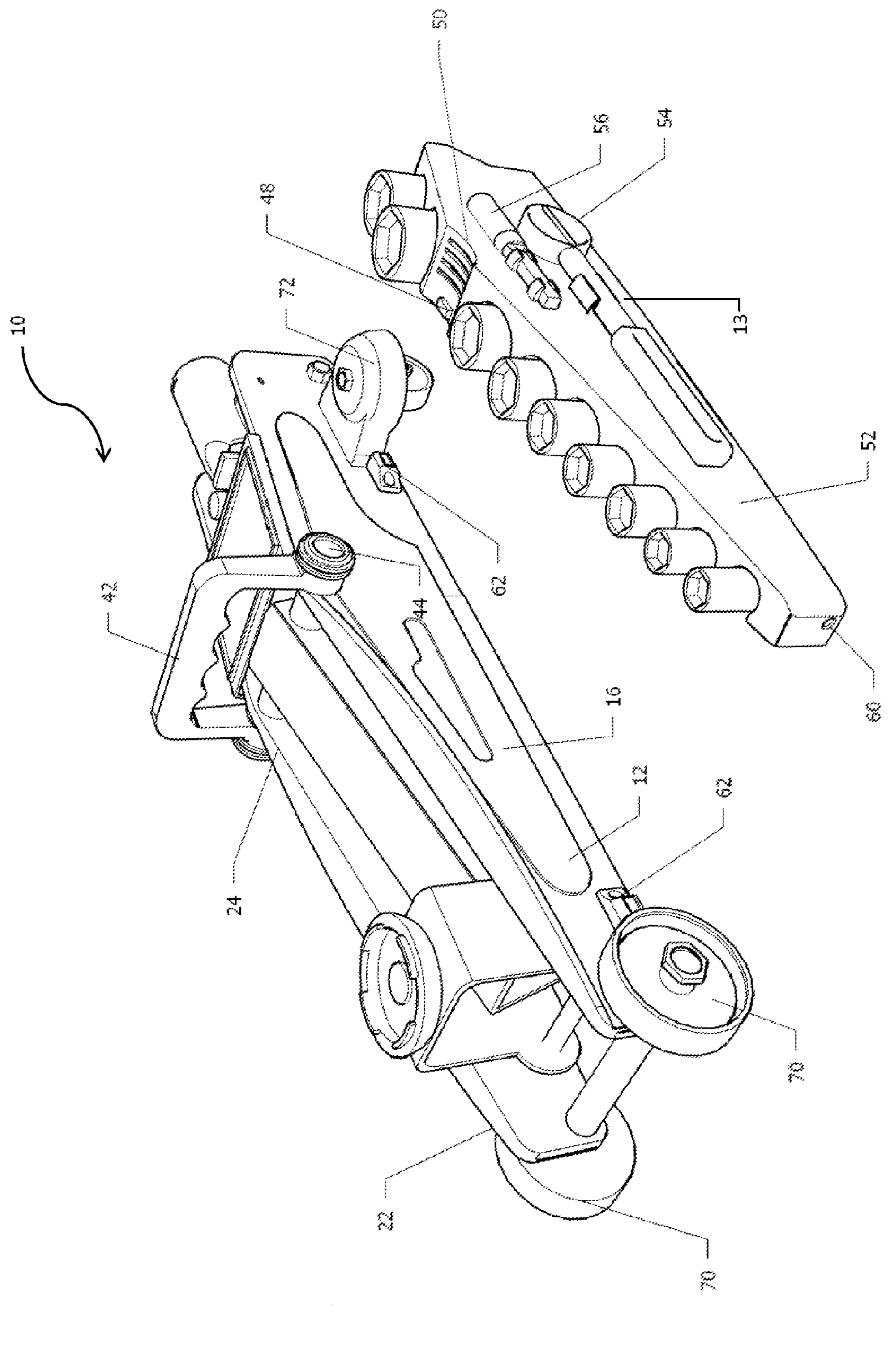
FIG. 9 is a front, left perspective view of the floor jack of FIG. 1, depicting the first kit assembly detached from the jack body.
Figure 10:
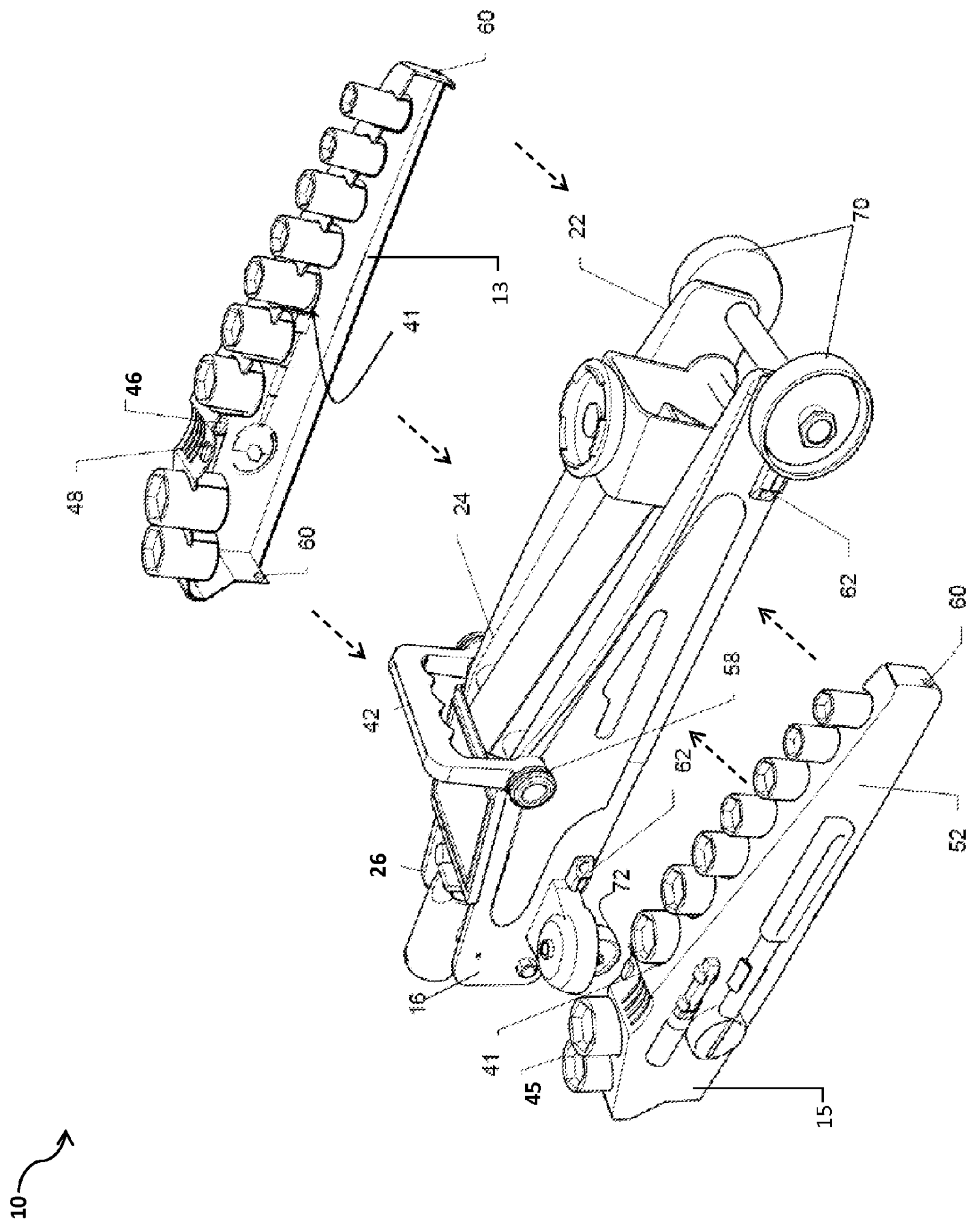
FIG. 10 is a front, right perspective view of the floor jack of FIG. 1, depicting the first and second tool kit assemblies detached from the jack body.

With reference to FIGS. 9 and 10, the storage bodies can be removed from the jack body. In this manner, a user can access the tools quickly without need of moving the floor jack, when needed.

The floor jack 10 further includes a pair of wheels 70 at the front portion 22 of the body, with an axle extending therebetween. Two caster wheels 72 are positioned in the end portion 26 of the body, attached to extensions from the sidewalls. The storage bodies 13, 15 are sized to be disposed between the front wheels 70 and the caster wheels 72.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. A floor jack, comprising:

a body having a front portion, an intermediate region, and an end portion, the body further having a pair of sidewalls spaced apart from each other;

a lifting assembly having a lift arm having a first end pivotally coupled to the intermediate region of the body and a second end proximate to the front portion, a top plate coupled to the second end of the lift arm, the top plate configured to engage a lifting location of an object to be lifted, and a driving head pivotally coupled to the end portion of the body to operate a hydraulic system housed within the body and configured to raise the lift arm; and a tool assembly having a storage housing pivotally coupled to an exterior side of a sidewall of the pair of sidewalls such that the orientation of the storage housing is operably confined within a prescribed range, the storage housing defining a plurality of storage locations configured to secure tools, the storage housing includes a deflectable portion positioned on an upper edge thereof to engage a corresponding catch of the body to maintain the storage housing in an upright configuration.

2. The floor jack as defined in claim 1, wherein the plurality of storage locations are disposed along an upper edge of the storage housing and each storage location is configured to receive a single wrench socket of a prescribed size.

3. The floor jack-as defined in claim 2, wherein the storage housing is removably attached to a sidewall of the body.

4. The floor jack as defined in claim 1, wherein the body includes a handle having a central portion disposed above the intermediate region and opposing end portions secured to pivot attachments coupled to the sidewalls in the intermediate region; and the deflectable portion is disposed in a curved portion of the upper edge having a curved shape conforming to the pivot attachment on the corresponding sidewall.

5. The floor jack as defined in claim 1, wherein the storage housing includes a front wall configured to receive a plurality of tools.

6. The floor jack as defined in claim 5, wherein the front wall includes a plurality of opposing arms configured to receive the tools in a snap fit manner.

7. A floor jack, comprising:

a body having a front portion, an intermediate region, and an end portion, the body further having a pair of sidewalls spaced apart from each other, the first sidewall of the pair of sidewalls having a pair of posts spaced apart from each other proximate to a bottom edge thereof;

a lifting assembly having a lift arm having a first end pivotally coupled to the intermediate region of the body and a second end proximate to the front portion, a top plate coupled to the second end of the lift arm, the top plate configured to engage a lifting location of an object to be lifted, and a driving head pivotally coupled to the end portion of the body to operate a hydraulic system housed within the body and configured to raise the lift arm;

a first tool assembly having a storage housing pivotally coupled to the posts of the first sidewall, the storage housing defining a plurality of storage locations configured to secure tools, the storage housing having an upper portion, a lower portion, and a front wall, the upper portion defining a plurality of storage locations configured to secure tools, the storage housing defining apertures that mate with the posts in such a manner to enable the storage housing to pivot away from the first sidewall, and a plurality of tools securely received in the plurality of storage locations.

8. The floor jack as defined in claim 7, wherein an upper edge of the storage body includes a deflectable portion positioned to mate with the body in a snap-fit arrangement and a detachable manner.

9. The floor jack as defined in claim 7, wherein the plurality of storage locations receive a plurality of sockets in a generally vertical orientation.

10. The floor jack as defined in claim 9, wherein the front wall includes opposing arms configured to receive a tool in a snap-fit manner.

11. The floor jack as defined in claim 9, wherein the opposing arms are configured to receive a socket wrench.

12. The floor jack as defined in claim 11, wherein the plurality of storage locations are configured to receive a plurality of sockets in a generally vertical orientation.

13. The floor jack as defined in claim 12, wherein an upper edge of the storage housing includes a deflectable portion configured to couple to an attachment of a handle of the body in a snap-fit arrangement and a detachable manner to maintain the storage housing in an upright orientation relative to the respective sidewall, the deflectable portion is disposed in a curved portion of the upper edge conforms to the attachment of the handle, the curved portion being disposed between two storage locations of the plurality of storage locations.

14. The floor jack as defined in claim 7, wherein the front wall of the storage body is configured to receive a plurality of tools.

15. A floor jack, comprising:

a body having a front portion, an intermediate region, and an end portion, the body further having a pair of sidewalls spaced apart from each other, a first sidewall of the pair of sidewalls having a forward pivot attachment and an aft pivot attachment spaced apart from each other;

a lifting assembly having a lift arm having a first end pivotally coupled to the body and a second end proximate to the front portion, a top plate coupled to the second end of the lift arm, the top plate configured to engage a lifting location of an object to be lifted, and a driving head pivotally coupled to the end portion of the body to operate a hydraulic system housed within the body and configured to raise the lift arm; and a first tool assembly having a storage housing defining a plurality of storage locations configured to secure tools, the storage housing including an upper edge having a deflectable portion positioned to engage a lip of the body in a snap-fit arrangement and a detachable manner while the storage housing is in an upright orientation relative to the first sidewall, a forward end that mates with the forward pivot attachment of the body in a pivotal mount arrangement proximate to a lower edge of the storage location, and an aft end that mates the aft pivot attachment of the body in a pivotal mount arrangement proximate to a lower edge of the storage location, such that the forward pivot attachment and the aft pivot attachment cooperatively enable the storage housing to pivot away from the sidewall.

16. The floor jack as defined in claim 15, wherein the annular lip is defined by a handle attachment of the body.

17. The floor jack as defined in claim 16, wherein the deflectable portion is disposed in a curved portion of the upper edge of the storage body that is shaped to conform to the handle attachment.

18. The floor jack as defined in claim 17, wherein the curved portion is disposed between two storage locations of the plurality of storage locations.

19. The floor jack as defined in claim 15, further comprising a second tool assembly having a storage housing mounted to a second sidewall of the pair of sidewalls.

* * * * *